June 3, 1930.  A. C. WHATLEY  1,761,900
POWER TAKE-OFF
Filed Oct. 3, 1929
Fig. 1.
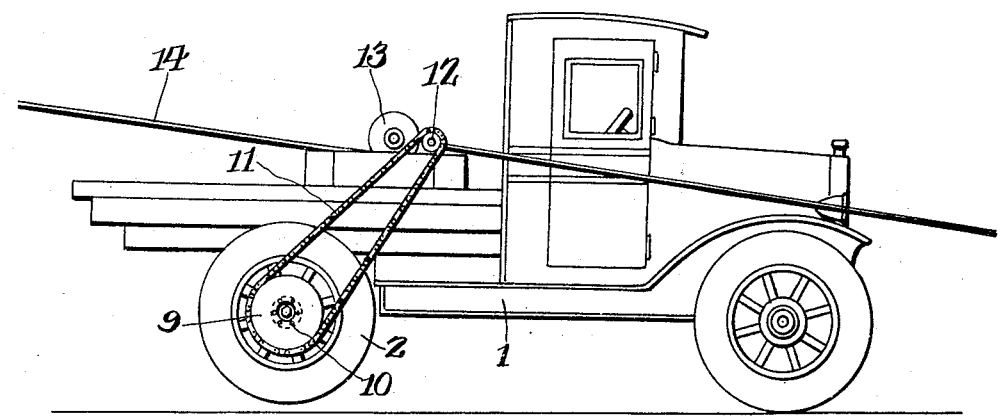
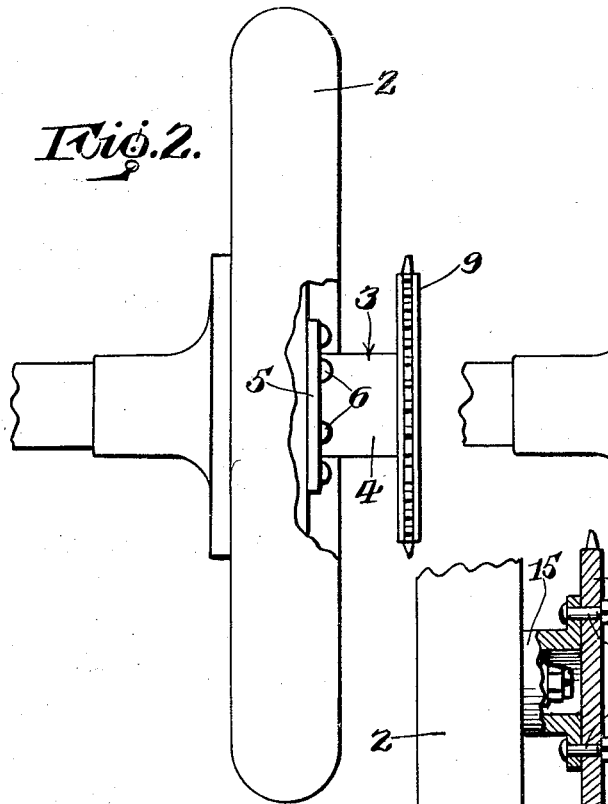
Fig. 2.
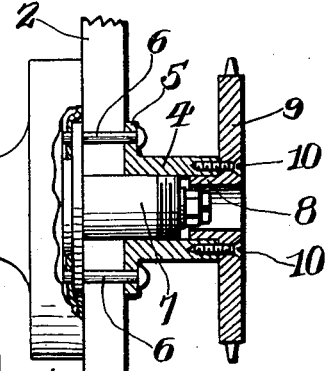
Fig. 3.
Fig. 4.
INVENTOR.
Arthur C. Whatley,
BY
Geo. P. Kimmel
ATTORNEY.

Patented June 3, 1930

1,761,900

UNITED STATES PATENT OFFICE

ARTHUR C. WHATLEY, OF OPELIKA, ALABAMA

POWER TAKE-OFF

Application filed October 3, 1929. Serial No. 397,114.

This invention relates to a power take-off and has for its primary object to provide, in a manner as hereinafter set forth, a device of such character which is adapted for connection with a rear wheel of a truck whereby the power from the truck motor may be transmitted to any suitable apparatus associated with the take-off for operating such apparatus.

With the foregoing and other objects in view, the invention consists of the novel construction, combination and arrangement of parts as hereinafter more particularly described, and as illustrated in the accompanying drawing wherein is shown an embodiment of the invention, but it is to be understood that the description and drawings are to be taken as illustrative and that the invention is intended to be limited only by the scope of the claims hereunto appended.

In the accompanying drawing in which like numerals are employed to designate like parts throughout the same:

Figure 1 is a side elevation of a truck showing an embodiment of my invention applied thereto and associated with a hoisting apparatus mounted on the truck.

Figure 2 is an elevation of the take-off device showing the same in operative position on a truck wheel.

Figure 3 is a fragmentary vertical section through the embodiment illustrated in Figure 2.

Figure 4 is a fragmentary sectional elevation showing a modified form of the invention.

Referring to the drawing in detail, the numeral 1 indicates a truck upon one of the rear wheels 2 of which is mounted my improved take-off device which is indicated generally by the numeral 3. The power take-off 3 includes a tubular member 4 formed on one end with a circumferentially extending flange 5. The member 4 is adapted to replace the usual hub and hub flange, not shown, of the wheel and may be secured in position by passing through the flange 5 the usual holdfast devices 6 for the hub flange which has been removed and securing the holdfast devices 6 to the wheel 2 in the usual manner.

When the tubular member 4 is secured to the wheel, the axle 7 of the vehicle projects into the tubular member as indicated in Figure 3.

Extending into the outer end of the tubular member 4 is an annular flange 8 of a sprocket 9 which is secured to the tubular member 4 by means of a plurality of holdfast devices 10 which extend through the sprocket 9 and into the tubular member 4 at the outer edge of the latter.

By jacking up the rear wheels of the truck, the power which is usually applied to the rear wheels for driving the truck may be transmitted through the rear wheels 2 and tubular member 4 to the sprocket 9. Carried by the sprocket 9 is a sprocket chain 11 which, in the embodiment illustrated in Figure 1, drives a gear 12 for operating a drum 13 upon which a hoisting line 14 is wound. Obviously, the sprocket chain 11 may be adapted for connection with any other type of apparatus which it is desired to operate.

In the embodiment illustrated in Figure 4, the tubular member 15 is secured to the wheel 2 in the same manner as the tubular member 4 heretofore described. The member 15 is formed adjacent its outer end with a circumferentially extending flange, to which the sprocket 17 is secured by means of a plurality of holdfast devices 18. The sprocket 17 is of solid construction throughout except for the openings formed therein for the passage of the holdfast devices 18.

It is thought that the many advantages of a power take-off in accordance with this invention will be readily apparent, and although the preferred embodiments of the invention are as illustrated and described, it is to be understood that changes in the details of construction may be resorted to, so long as such changes fall within the scope of the invention as defined in the appended claims.

What I claim is:

1. A power take-off comprising, a tubular member adapted to replace the hub and hub flange of a vehicle wheel, a sprocket having an annular flange extending into said tubular member, and holdfast devices extending through the sprocket and into the tubular member.

2. A power take-off comprising, a tubular member formed on one end with a circumferentially extending flange, holdfast devices extending through the flange for securing the tubular member to a vehicle wheel, a sprocket having an annular flange extending into said tubular member, and holdfast devices extending through the sprocket and into the tubular member.

In testimony whereof, I affix my signature hereto.

ARTHUR C. WHATLEY.